T. A. WILLSON & G. W. MEIGS.
EYE-GLASS FRAMES.
No. 195,193. Patented Sept. 11, 1877.
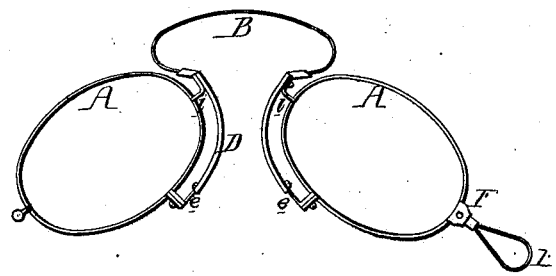
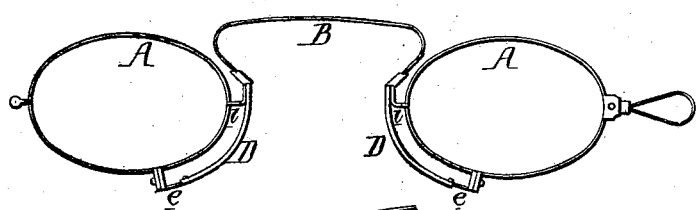
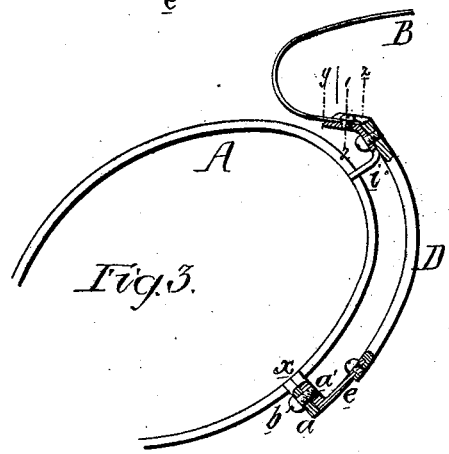
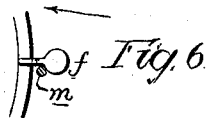
Witnesses
Richard L. Gardiner
Harry Smith
Inventors
Thomas A. Willson
and
George W. Meigs
by their Attorneys
Howson Son

UNITED STATES PATENT OFFICE.

THOMAS A. WILLSON AND GEORGE W. MEIGS, OF READING, PENNSYLVANIA, ASSIGNORS TO SAID WILLSON, GILES J. WILLSON, AND CLEMENT B. BISHOP, OF SAME PLACE.

IMPROVEMENT IN EYEGLASS-FRAMES.

Specification forming part of Letters Patent No. 195,193, dated September 11, 1877; application filed June 9, 1877.

*To all whom it may concern:*

Be it known that we, THOMAS A. WILLSON and GEORGE W. MEIGS, both of Reading, Pennsylvania, have invented a new and useful Improvement in Eyeglasses, and in the manufacture of the same, of which the following is a specification:

The object of our invention is to cheapen the manufacture of eyeglasses and improve the product—an object which we attain in the following manner:

In the accompanying drawing, Figure 1 is a front view of a pair of eyeglasses with our improvements; Fig. 2, the same, showing the glasses moved farther apart from each other than in Fig. 1; Fig. 3, an enlarged view, partly in section; and Figs. 4, 5, 6, 7, 8, and 9, detached views illustrating some of the features of our invention.

A A are the two elliptical frames or eyes for the glasses, and B the intervening spring. Each frame is severed and united at $x$ by flanges $a$ $a'$ and a screw, $b$, the flange $a'$ having a projection, $e$, to which is secured the lower end of a nose-piece, D, of horn, hard rubber, or other suitable material. The upper end of the nose-piece D is secured to a strip of metal, $i$, made in the form best observed in Fig. 3, and secured at one end to the frame. A portion of the strip $i$, at and near the outer end of the same—that is, between the dotted lines $z$ and $y$—is bent inward from the nose-piece toward the eye, and this portion of the strip has side flanges, so as to form a pocket for the reception of one end of the spring B, the upper ends of the flanges being bent over the edges of the spring, as shown in Fig. 4, so as to retain the same, further security being attained by the use of a set-screw, $d$, the head of which, however, does not project above the flanges of the plate $i$, and thus detract from the appearance of the joint—a common objection when an intervening plate is used, as usual.

By this arrangement of parts, also, the spring B is securely fastened to the frame without interfering with the nose-piece or obstructing its proper bearing against the wearer's nose, the connection of the upper end of the said nose-piece with the frame being through the medium of the same strip $i$, while the projection $e$ of the flange $a'$ serves as a medium for connecting the lower end of the nose-piece to the flange.

The handle E, instead of being constructed and secured to the frame in the usual manner, is made of a strip of thin wire bent to the desired shape, the ends of the strip being then inserted in an opening in a block, F, Fig. 5, and secured therein by pressure applied to the block. The latter is then properly finished by filing or otherwise, and finally secured to the eye by brazing.

By this means the handles E can be readily made and secured to the block F, and, when completed, the whole presents a neater and more finished appearance than the ordinary handle.

The catch $f$ on the other eye is also of a peculiar character, consisting of a base secured to the eye at right angles to the same, a circular head or disk parallel with the eye, and a thin stem or neck connecting the two. When this is hooked over the retaining-pin $m$, as shown in Fig. 6, a slight pressure exerted in the direction of the arrow is sufficient to cause the rounded head of the catch to slide over the pin and release the eye; but the catch is not liable to accidental displacement, as it is comparatively difficult to dislodge unless the pressure be applied to the direction pointed out.

Owing to the peculiar form of this catch, it would be difficult and expensive to manufacture by forging or filing. Consequently we make it in the following manner:

A flat plate of the form shown in Fig. 7 is first punched out of a strip of sheet metal, and this plate is then secured to the frame or eye in a direction at right angles to the same, as shown. The neck connecting the base and head of the catch is then twisted, as shown in Fig. 8, so as to bring the head in line with the frame. The neck is then reduced by filing, and the catch assumes the finished shape shown in Fig. 9.

We claim as our invention—

1. The combination of the nose-piece D, spring B, and eye A with the strip $i$, bent upward and backward, as described.

2. The combination of the spring B, the strip $i$, bent upward and backward, as described, and having flanges bent over the edges of the spring, and the screw $d$, as set forth.

3. The combination of the eyeglass-frame A and block F, with the handle E, formed of a bent strip of wire having its ends secured in an opening in said block, substantially as specified.

4. The mode herein described of manufacturing a catch for eyeglasses—that is to say, first punching out a sheet-metal plate comprising a head, base, and connecting-stem, then securing this to the frame at right angles to the same, then twisting the neck so as to bring the head into line with the frame, and finally reducing the neck, as described.

In testimony whereof we have signed our names to this specification in the presence of two subscribing witnesses.

THOMAS A. WILLSON.
GEORGE W. MEIGS.

Witnesses:
JAMES R. KENNEY,
J. H. JACOBS.